(12) United States Patent
Yasugi et al.

(10) Patent No.: US 12,684,139 B2
(45) Date of Patent: Jul. 14, 2026

(54) VIDEO DECODING APPARATUS AND VIDEO CODING APPARATUS

(71) Applicant: Sharp Kabushiki Kaisha, Sakai City (JP)

(72) Inventors: Yukinobu Yasugi, Sakai City (JP); Tomohiro Ikai, Sakai City (JP); Tomoko Aono, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/878,947

(22) PCT Filed: Jun. 29, 2023

(86) PCT No.: PCT/JP2023/024130
§ 371 (c)(1),
(2) Date: Dec. 26, 2024

(87) PCT Pub. No.: WO2024/009877
PCT Pub. Date: Jan. 11, 2024

(65) Prior Publication Data
US 2025/0392730 A1 Dec. 25, 2025

(30) Foreign Application Priority Data
Jul. 5, 2022 (JP) ................................. 2022-108070

(51) Int. Cl.
*H04N 19/167* (2014.01)
*H04N 19/132* (2014.01)
*H04N 19/176* (2014.01)

(52) U.S. Cl.
CPC ......... *H04N 19/167* (2014.11); *H04N 19/132* (2014.11); *H04N 19/176* (2014.11)

(58) Field of Classification Search
CPC .. H04N 19/167; H04N 19/132; H04N 19/176; H04N 19/55; H04N 19/70; H04N 19/105
See application file for complete search history.

(56) References Cited

U.S. PATENT DOCUMENTS

| | | | |
|---|---|---|---|
| 2011/0122950 A1* | 5/2011 | Ji | H04N 19/51 375/E7.243 |
| 2016/0173766 A1* | 6/2016 | Chen | G06T 3/08 348/222.1 |

(Continued)

OTHER PUBLICATIONS

Chen et al., "AHG12: Enhanced bi-directional motion compensation", Joint Video Experts Team (JVET) of ITU-T SG 16 WP 3 and ISO/IEC JTC 1/SC 29, JVET-Y0125, Jan. 12-21, 2022, pp. 1-4.

*Primary Examiner* — Nasim N Nirjhar
(74) *Attorney, Agent, or Firm* — Keating & Bennett, LLP

(57) ABSTRACT

Video coding and decoding apparatuses that can enhance coding efficiency are provided. A video decoding apparatus includes an OOB determination unit configured to determine whether a reference block is targeted for OOB processing by comparing coordinates of the reference block with coordinates of a picture, and an OOB mask derivation unit configured to derive mask data representing availability of each pixel by comparing coordinates of a pixel included in the reference block with coordinates of the picture. The OOB determination unit determines whether the reference block is the target of the OOB processing by detecting whether wrap-around processing is applied to a reference picture including the reference block. The OOB determination unit determines whether the reference block is targeted for the OOB processing by detecting whether reference picture resampling processing is applied to the reference picture including the reference block.

6 Claims, 10 Drawing Sheets

(56)                    References Cited

U.S. PATENT DOCUMENTS

2021/0297697 A1*  9/2021  Hannuksela ........... H04N 19/70
2022/0312008 A1*  9/2022  Wang ................... H04N 19/186
2023/0328257 A1*  10/2023 Zhang ................. H04N 19/182

\* cited by examiner (a)

MV

COLLOCATED BLOCK

TARGET BLOCK (b)

HIGH-RESOLUTION PICTURE        LOW-RESOLUTION PICTURE        HIGH-RESOLUTION PICTURE

TIME t (a)

(b)

(c)

VIDEO DECODING APPARATUS AND VIDEO CODING APPARATUS

TECHNICAL FIELD

An embodiment of the present invention relates to a video decoding apparatus and a video coding apparatus.

BACKGROUND ART

A video coding apparatus which generates coded data by coding a video, and a video decoding apparatus which generates decoded images by decoding coded data are used for efficient transmission or recording of videos.

Specific video coding schemes include, for example, H.264/AVC, High-Efficiency Video Coding (HEVC), Versatile Video Coding (VVC) schemes, and the like.

In such a video coding scheme, images (pictures) constituting a video are managed in a hierarchical structure including slices obtained by splitting an image, Coding Tree Units (CTUs) obtained by splitting a slice, Coding Units (CUs) obtained by splitting a coding tree unit, and Transform Units (TUs) obtained by splitting a coding unit, and are coded/decoded for each CU.

In such a video coding scheme, usually, a prediction image is generated based on a locally decoded image that is obtained by coding/decoding an input image, and a prediction error (which may be referred to also as a "difference image" or a "residual image") obtained by subtracting the prediction image from the input image (source image) is coded. Generation methods of prediction images include inter picture prediction (inter prediction) and intra picture prediction (intra prediction). In VVC, as in FIG. 8(a), coordinates of motion vectors are subjected to wrap-around processing, and thus motion compensation can be continuously performed between a left edge and a right edge of a picture regarding a horizontal coordinate system. Therefore, by applying the wrap-around processing to images whose right and left edges of a picture are spatially continuous, such as a 360-degree panoramic image and a 360-degree image, coding efficiency can be enhanced. In VVC, as in FIG. 8(b), Reference Picture Resampling (RPR) processing can be performed, in which motion compensation is performed by changing resolution on a per picture basis. By applying the RPR processing to services with a varying transmission rate, such as Internet video streaming, image quality can be enhanced.

NPL 1 discloses an Out-Of-Boundary (OOB) processing technique, in which a part or all of a region of one reference block of bi-prediction present out of a picture of a reference image is substituted with a part or all of a region of another reference block.

CITATION LIST

Non Patent Literature

NPL 1: "AHG12: Enhanced bi-directional motion compensation", Joint Video Experts Team (JVET) of ITU-T SG 16 WP 3 and ISO/IEC JTC 1/SC 29 25th Meeting, by teleconference, JVET-Y0125

SUMMARY OF INVENTION

Technical Problem

In NPL 1, a problem exists in that OOB determination processing corresponding to the wrap-around processing is not present, and thus the wrap-around processing and the OOB processing cannot be simultaneously applied. In a case that the wrap-around processing is applied and a reference block is at an outer position with respect to a left edge of a picture as in FIG. 8, a region on the right side of the picture is referred to. Thus, the horizontal coordinate system is not subject to out of the picture, and thus there is a problem that coding efficiency may be reduced in a case that the OOB processing is applied. In NPL 1, a problem exists in that OOB determination processing corresponding to the RPR processing is not present, and thus the RPR processing and the OOB processing cannot be simultaneously applied. In the RPR processing, a reference picture having a size different from that of a target picture is reduced on a prescribed scale and is stored in a reference picture buffer. This makes a coordinate system of the reference picture different from a coordinate system of the target picture, and thus there is a problem that correct OOB determination processing cannot be performed in a case that the RPR processing and the OOB processing are used together.

Solution to Problem

In order to solve the problem described above, a video decoding apparatus according to an aspect of the present invention is a video decoding apparatus including an OOB determination unit configured to determine whether a reference block is targeted for OOB processing by comparing coordinates of the reference block with coordinates of a picture, and an OOB mask derivation unit configured to derive mask data representing availability of each pixel by comparing coordinates of a pixel included in the reference block with coordinates of the picture, wherein the OOB determination unit determines whether the reference block is targeted for the OOB processing by detecting whether wrap-around processing is applied to a reference picture including the reference block, and the OOB determination unit determines whether the reference block is the target of the OOB processing by detecting whether reference picture resampling processing is applied to the reference picture including the reference block.

Advantageous Effects of Invention

According to an aspect of the present invention, the amount of calculation required for the OOB processing can be reduced in video coding/decoding processing.

DESCRIPTION OF EMBODIMENTS

First Embodiment

Embodiments of the present invention will be described below with reference to the drawings.

Figure 1:
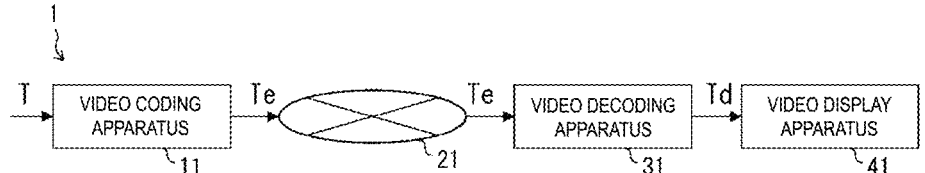
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not limited to a bidirectional communication network and may be a unidirectional communication network that transmits broadcast waves for terrestrial digital broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Examples of display types include stationary, mobile, and HMD. In addition, in a case that the video decoding apparatus 31 has a high processing capability, an image having high image quality is displayed, and in a case that the video decoding apparatus has a lower processing capability, an image which does not require high processing capability and display capability is displayed.

Operators

Operators used in the present specification will be described below.

">>" is a right bit shift, "<<" is a left bit shift, "&" is a bitwise AND, "I" is a bitwise OR, "I=" is an OR assignment operator, and "∥" indicates a logical sum.

x?y: z is a ternary operator that takes y in a case that x is true (other than 0) and takes z in a case that x is false (0).

Clip3(a, b, c) is a function to clip c in a value from a to b, and a function to return a in a case that c is smaller than a (c<a), return b in a case that c is greater than b (c>b), and return c in the other cases (provided that a is smaller than or equal to b (a<=b)).

ClipH(o, W, x) is a function that returns x in a case that x<0, x-o in a case that x>W-1, and x in other cases.

sign(a) is a function that returns 1 in a case that a>0, 1 in a case that a==0, and -1 in a case that a<0.

abs(a) is a function that returns the absolute value of a.

Int(a) is a function that returns the integer value of a.

floor(a) is a function that returns the maximum integer equal to or smaller than a.

ceil(a) is a function that returns the minimum integer equal to or greater than a.

a/d represents division of a by d (round down decimal places).

~ represents bitwise negation (not). It is a function that returns 0 of each bit as 1 and 1 as 0.

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
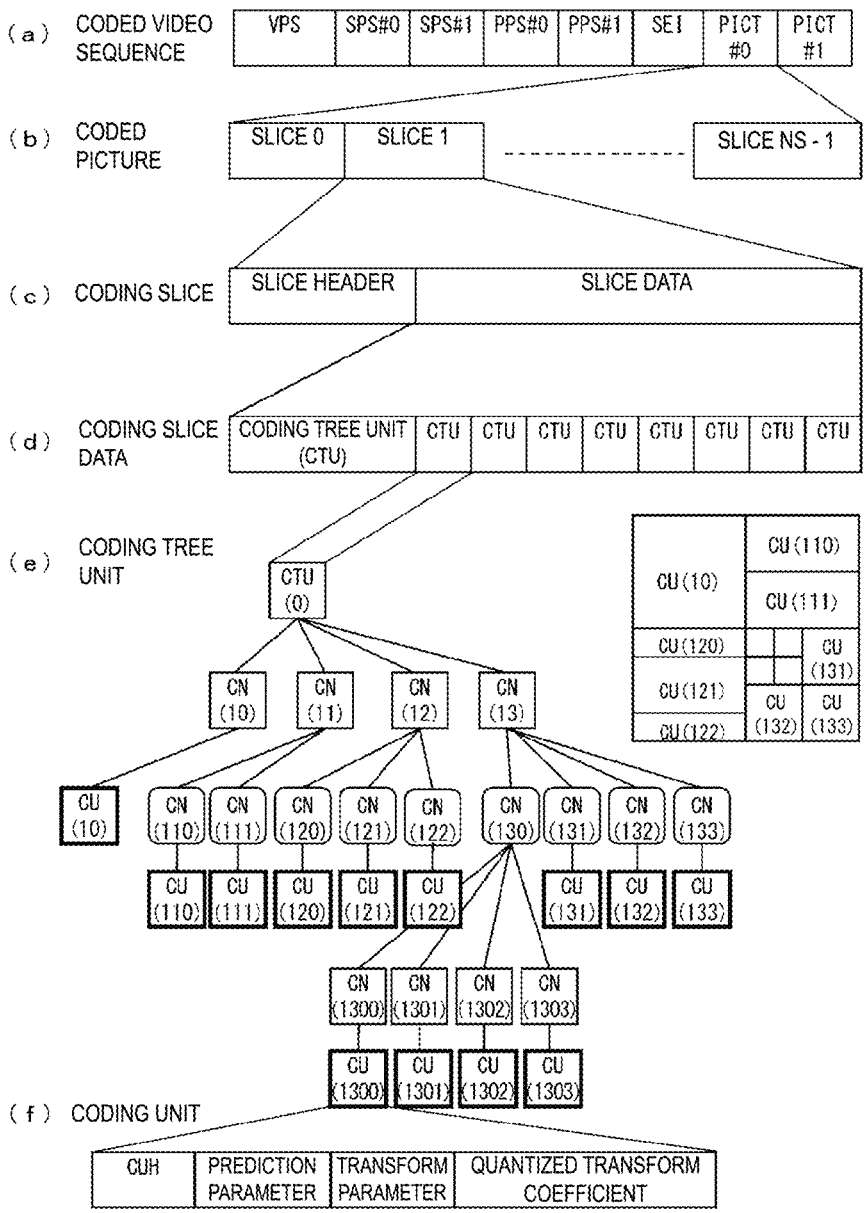
FIG. 2 is a diagram illustrating a hierarchical structure of data of a coding stream.

FIG. 2 is a diagram illustrating a hierarchical structure of data of the coding stream Te. The coding stream Te includes, as an example, a sequence and multiple pictures constituting the sequence. (a) to (f) of FIG. 2 are diagrams illustrating a coded video sequence predefining a sequence SEQ, a coded picture defining a picture PICT, a coding slice defining a slice S, a coding slice data defining slice data, a coding tree unit included in the coding slice data, and a coding unit included in the coding tree unit, respectively.

Coded Video Sequence

In the coded video sequence, a set of data referred to by the video decoding apparatus 31 to decode a sequence SEQ to be processed is defined. As illustrated in FIG. 2, the sequence SEQ includes a Video Parameter Set, Sequence Parameter Sets SPS, Picture Parameter Sets PPS, an Adaptation Parameter Set (APS), a picture PICT, and Supplemental Enhancement Information SEI.

The video parameter set VPS defines, in a video including multiple layers, a set of coding parameters common to multiple video images and a set of coding parameters relating to multiple layers and individual layers included in the video.

In the sequence parameter sets SPSs, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter sets (PPS), a set of coding parameters that the video decoding apparatus 31 refers to in order to decode each picture in the target sequence is defined. For example, a PPS includes a reference value for a quantization step size used in picture decoding (pic_init_qp_minus26) and a flag indicating application of weighted prediction (weighted_pred_flag). Note that multiple PPSs may exist. In that case, any of the multiple PPSs is selected from each picture in a target sequence.

Coded Picture

In the coded picture, a set of data referred to by the video decoding apparatus 31 to decode a picture PICT to be processed is defined. The picture PICT includes slice 0 to slice NS-1 (NS is the total number of slices included in the picture PICT) as illustrated in FIG. 2.

Note that, in a case that it is not necessary to distinguish each of the slice 0 to the slice NS-1 below, numeric suffixes of reference signs may be omitted. In addition, the same applies to other data with suffixes included in the coding stream Te which will be described below.

Coding Slice

In each coding slice, a set of data referred to by the video decoding apparatus 31 to decode a slice S to be processed is defined. The slice includes a slice header and slice data as illustrated in FIG. 2.

The slice header includes a coding parameter group referred to by the video decoding apparatus 31 to determine a decoding method for a target slice. Slice type indication information (slice_type) indicating a slice type is one example of a coding parameter included in the slice header.

Examples of slice types that can be indicated by the slice type indication information include (1) an I slice for which only intra prediction is used for coding, (2) a P slice for which unidirectional prediction or intra prediction is used for coding, (3) a B slice for which unidirectional prediction, bidirectional prediction, or intra prediction is used for coding. Note that the inter prediction is not limited to uni-prediction and bi-prediction, and a prediction image may be generated by using a larger number of reference pictures. Hereinafter, in a case of a slice being referred to as a P or B slice, it indicates a slice including a block in which inter prediction can be used.

Note that the slice header may include a reference to the picture parameter set PPS (pic_parameter_set_id).

Coding Slice Data

In coding slice data, a set of data referred to by the video decoding apparatus 31 to decode slice data to be processed is defined. The slice data includes CTUs as illustrated in FIG. 2(*d*). A CTU is a block in a fixed size (for example, 64×64) constituting a slice, and may also be called a Largest Coding Unit (LCU).

Coding Tree Unit

In FIG. 2, a set of data referenced by the video decoding apparatus 31 to decode a CTU to be processed is defined. The CTU is split into coding units CUs, each of which is a basic unit of coding processing, by a recursive Quad Tree (QT) split, Binary Tree (BT) split, or Ternary Tree (TT) split. The BT split and the TT split are collectively referred to as Multi Tree (MT) split. A node of a tree structure obtained by recursive quad tree split is referred to as a Coding Node. An intermediate node of a quad tree, a binary tree, and a ternary tree is a coding node, and a CTU itself is also defined as the highest coding node. The lowest coding node is defined as the coding unit.

Coding Unit

In FIG. 2, a set of data referenced by the video decoding apparatus 31 to decode a coding unit to be processed is defined. Specifically, a CU includes a CU header CUH, a prediction parameter, a transform parameter, a quantized transform coefficient, and the like. In the CU header, a prediction mode and the like are defined.

The prediction processing may be performed for each CU or performed for each sub-CU, the sub-CU being obtained by further splitting the CU. In a case that a CU and a sub-CU have an equal size, the number of sub-CUs in the CU is one. In a case that a CU has a size larger than that of a sub-CU, the CU is split into sub-CUs. For example, in a case that a CU has a size of 8×8, and a sub-CU has a size of 4×4, the CU is split into four sub-CUs which include two horizontal splits and two vertical splits.

Types of prediction (prediction mode) include intra prediction (MODE_INTRA), inter prediction (MODE_INTER), and an intra block copy (MODE_IBC). Intra prediction refers to prediction in the same picture, and inter prediction refers to prediction processing performed between different pictures (for example, between pictures of different display times, and between pictures of different layer images).

Although transform and quantization processing is performed for each CU, entropy coding of a quantized transform coefficient may be performed for each subblock such as 4×4.

Prediction Parameters

A prediction image is derived by prediction parameters associated with blocks. The prediction parameters include intra prediction and inter prediction parameters.

Prediction Parameters for Inter Prediction

The prediction parameters for inter prediction will be described. Inter prediction parameters include prediction list utilization flags predFlagL0 and predFlagL1, reference picture indices refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether XX is applied", the flag indicating a value other than 0 (for example, 1) means a case where XX is applied, and the flag indicating 0 means a case where XX is not applied, and 1 is treated as true and 0 is treated as false in a logical negation, a logical product, and the like (hereinafter, the same applies). However, other values can be used for true values and false values in real apparatuses and methods.

Syntax elements for deriving the inter prediction parameters include, for example, a merge flag merge_flag (general_merge_flag), a merge index merge_idx, merge_subblock_flag, regulare_merge_flag, ciip_flag, merge_gpm_partition_idx, merge_gpm_idx0, merge_gpm_idx1, inter_pred_idc, a reference picture index refIdxLX, mvp_LX_idx, a difference vector mvdLX, and a motion vector resolution mode amvr_mode. merge_subblock_flag is a flag indicating whether the inter prediction of each subblock is used. regulare_merge_flag is a flag indicating whether a normal merge mode or MMVD is used. ciip_flag is a flag indicating whether or not a combined inter-picture merge and intra-picture prediction (CIIP) mode is used. merge_gpm_partition_idx is an index indicating a split shape of a GPM mode. merge_gpm_idx0 and merge_gpm_idx1 are each an index indicating a merge index of the GPM mode. inter_pred_idc is an inter prediction indicator for selecting a reference picture to be used in an AMVP mode. mvp_LX_idx is a prediction vector index for deriving the motion vector.

Reference Picture List

A reference picture list is a list including reference pictures stored in a reference picture memory 306. For individual CUs, which picture in a reference picture list RefPicListX (X=0 or 1) is actually referred to is indicated with refIdxLX. Note that LX is a description method used in a case of not distinguishing L0 prediction and L1 prediction, and in the following description, distinguishes parameters for the L0 list and parameters for the L1 list by replacing LX with L0 and L1.

Merge Prediction and AMVP Prediction

Decoding (coding) methods for prediction parameters include a merge prediction (merge) mode (merge mode) and an Advanced Motion Vector Prediction (adaptive motion vector prediction (AMVP)) mode, and general_merge_flag is a flag for identifying these. The merge mode is a prediction mode in which some or all of motion vector differences are omitted, and a mode in which a prediction list utilization flag predFlagLX, reference picture index refIdxLX, and a motion vector mvLX are derived from prediction parameters for neighboring blocks already processed, or the like, without being included in coded data. The AMVP mode is a mode in which inter_pred_idc, refIdxLX, and mvLX are included in the coded data. Note that mvLX is coded as mvp_LX_idx identifying a prediction vector mvpLX and a difference vector mvdLX. The prediction mode in which a motion vector difference is omitted or simplified is collectively referred to as a general merge mode, and the general merge mode and the AMVP prediction may be selected by general_merge_flag.

In a case that general_merge_flag is 1, regular_merge_flag may be transmitted separately. In a case that regular_merge_flag is 1, the normal merge mode or MMVD may be selected, and in other cases, the CIIP mode or the GPM mode may be selected. In the CIIP mode, a prediction image is generated using a weighted sum of an inter prediction image and an intra prediction image. In the GPM mode, a prediction image is generated as two non-rectangular prediction units obtained by splitting a target CU along a line segment.

inter_pred_idc is a value indicating the types and number of reference pictures, and takes any value of PRED_L0, PRED_L1, or PRED_BI. PRED_L0 and PRED_L1 indicate uni-prediction which uses one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is used as a prediction parameter for a target block, among prediction parameter candidates (merge candidates) derived from process-completed blocks.

Motion Vector mvLX indicates a shift amount between blocks in two different pictures. A prediction vector and a difference vector related to mvLX are referred to as mvpLX and mvdLX, respectively.

Inter Prediction Indicator inter_pred_idc and Prediction List Utilization Flag predFlagLX Relationships between inter_pred_idc and predFlagL0 and predFlagL1 are as follows, and can be transformed into one another.

$$inter\_pred\_idc = (predFlagL1 << 1) + predFlagL0$$

$$predFlagL0 = inter\_pred\_idc \ \& \ 1$$

$$predFlagL1 = inter\_pred\_idc >> 1$$

Note that the inter prediction parameters may use a prediction list utilization flag or may use an inter prediction indicator. In addition, determination using a prediction list utilization flag may be replaced with determination using an inter prediction indicator. On the contrary, determination using an inter prediction indicator may be replaced with determination using a prediction list utilization flag.

Determination of Bi-Prediction biPred

A flag biPred for identifying a bi-prediction can be derived from whether two prediction list utilization flags are both 1 . . . . For example, the derivation can be performed by the following expression.

$$biPred = (predFlagL0 == 1 \ \&\& \ predFlagL1 == 1)$$

Alternatively, biPred can be also derived from whether the inter prediction indicator is a value indicating the use of two prediction lists (reference pictures). For example, the derivation can be performed by the following expression.

$$biPred = (inter\_pred\_idc == PRED\_BI) \ ? \ 1:0$$

Configuration of Video Decoding Apparatus

Figure 3:
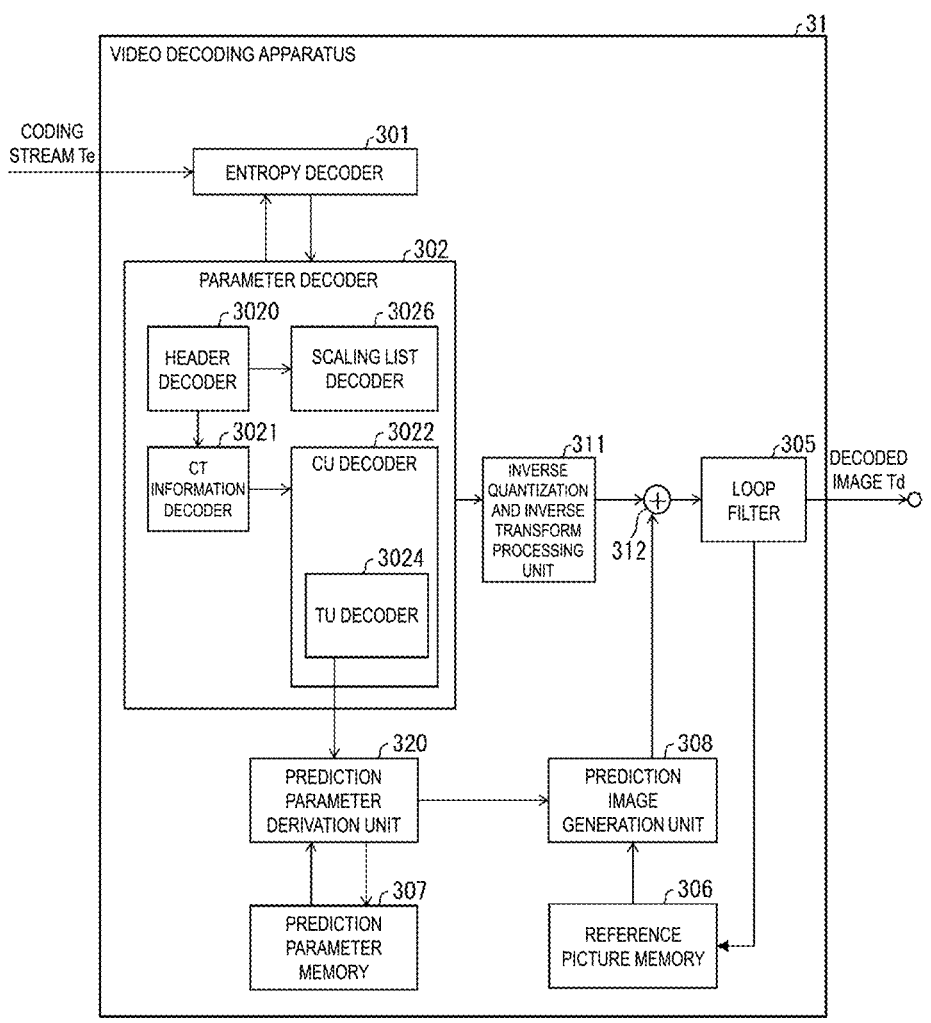
FIG. 3 is a schematic diagram illustrating a configuration of a video decoding apparatus.

A configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as a VPS, an SPS, a PPS, and an APS, and a slice header (slice information). The CT information decoder 3021 decodes a CT from coded data. The CU decoder 3022 decodes a CU from coded data. The TU decoder 3024 decodes a CU from coded data.

In a case that the TU includes a prediction error, the TU decoder 3024 decodes, from the coded data, QP update information and a quantized transform coefficient. The QP update information is a difference value from a quantization parameter prediction value qPpred, which is a prediction value of a quantization parameter QP.

The prediction image generation unit 308 includes an inter prediction image generation unit 309 (FIG. 4) and an intra prediction image generation unit 310.

The prediction parameter derivation unit 320 includes an inter prediction parameter derivation unit 303 (FIG. 5) and an intra prediction parameter derivation unit.

In addition, although an example in which CTU and CU are used as a unit of processing will be described below, the unit of processing is not limited to this example, and processing may be performed for each sub-CU. Alternatively, the CTU or the CU may be referred to as a block, the sub-CU may be referred to as a subblock, and processing may be performed on a per block or subblock basis.

The entropy decoder 301 performs entropy decoding on the coding stream Te input from the outside and decodes individual codes (syntax elements). The entropy coding includes a method in which variable-length coding of syntax elements is performed by using a context (probability model) adaptively selected according to a type of syntax element and a surrounding condition, and a method in which variable-length coding of syntax elements is performed by using a predetermined table or formula.

The entropy decoder 301 outputs the decoded codes to the parameter decoder 302. The decoded code is, for example, a prediction mode predMode, general_merge_flag, merge_idx, inter_pred_idc, refIdxLX, mvp_LX_idx, mvdLX, amvr_mode, and the like. Which code is to be decoded is controlled based on an indication of the parameter decoder 302.

Basic Flow

Figure 6:
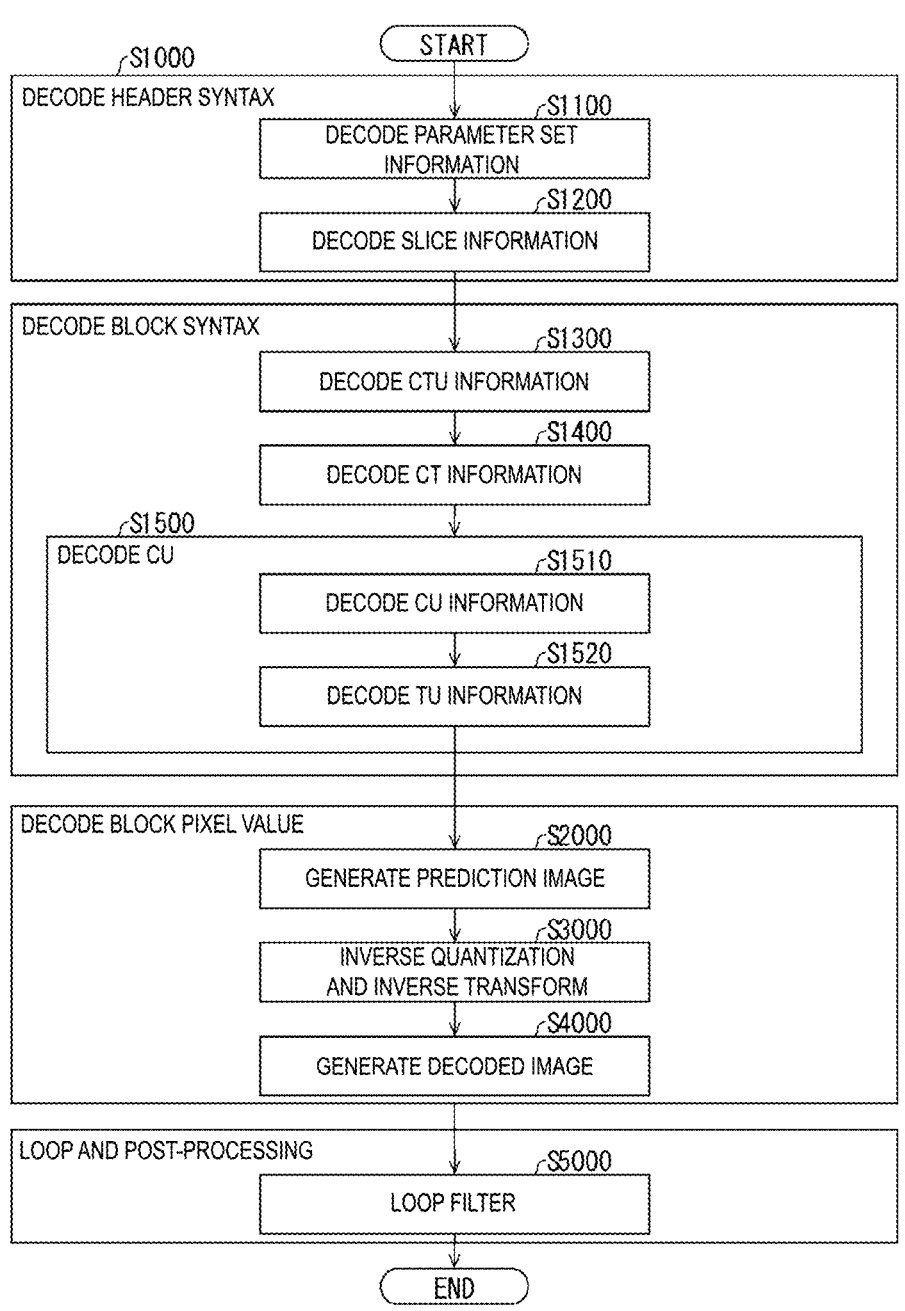
FIG. 6 is a flowchart illustrating general operation of the video decoding apparatus.

FIG. 6 is a flowchart illustrating general operation of the video decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag, a CU residual flag, and the like from the coded data.

(S1520: Decoding of TU information) In a case that the TU includes a prediction error, the TU decoder 3024 decodes, from the coded data, a quantization prediction error and the like.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a sample adaptive offset (SAO), and an adaptive loop filter (ALF) to a decoded image of a CU generated by the addition unit 312.

The reference picture memory 306 stores the decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores the parameter decoded by the parameter decoder 302, the prediction mode predMode separated by the entropy decoder 301, and the like.

To the prediction image generation unit 308, predMode, the prediction parameter, and the like are input. The prediction image generation unit 308 reads a reference picture from the reference picture memory 306. The prediction image generation unit 308 generates a prediction image of a block or a subblock by using the prediction parameter and the read reference picture (reference block) in the prediction mode indicated by predMode. Here, the reference block refers to a set of pixels (referred to as a block because they are normally rectangular) on the reference picture and is a region that is referred to for generating the prediction image.

Configuration of Inter Prediction Parameter Derivation Unit

Figure 5:
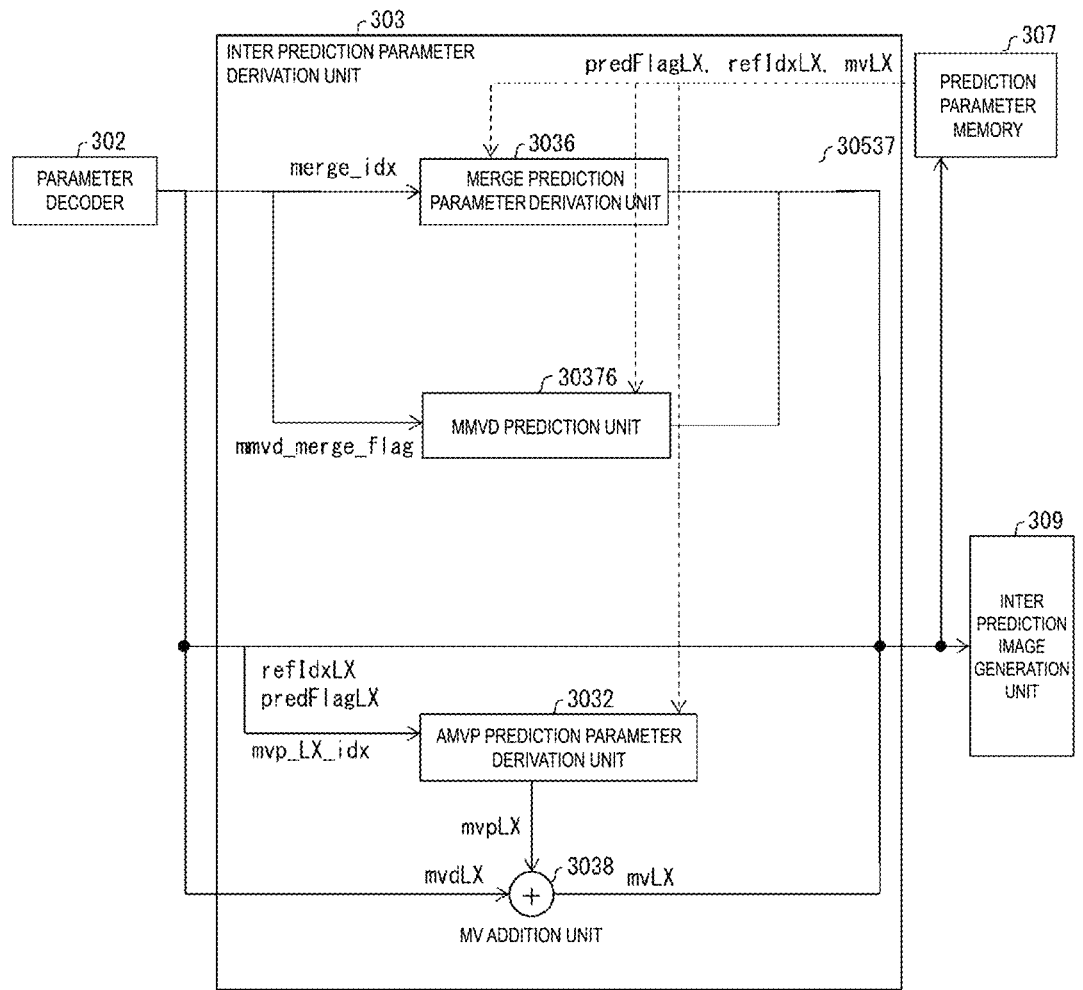
FIG. 5 is a schematic diagram illustrating a configuration of an inter prediction parameter derivation unit.

As illustrated in FIG. 5, the inter prediction parameter derivation unit 303 derives an inter prediction parameter with reference to the prediction parameters stored in the prediction parameter memory 307 based on the syntax element input from the parameter decoder 302. In addition, the inter prediction parameter is output to the inter prediction image generation unit 309 and the prediction parameter memory 307. Since the inter prediction parameter derivation unit 303 and an AMVP prediction parameter derivation unit 3032, a merge prediction parameter derivation unit 3036, an MMVD prediction unit 30376, and an MV addition unit 3038 serving as internal elements of the inter prediction parameter derivation unit 303 are means common to the video coding apparatus and the video decoding apparatus, they may be collectively referred to as a motion vector derivation unit (motion vector derivation apparatus).

In a case that general_merge_flag indicates 1, that is, the merge prediction mode, merge_idx is derived and output to the merge prediction parameter derivation unit 3036.

In a case that general_merge_flag indicates 0, that is, the AMVP prediction mode, the AMVP prediction parameter derivation unit 3032 derives mvpLX from inter_pred_idc, refIdxLX, or mvp_LX_idx.

MV Addition Unit

The MV addition unit 3038 adds derived mvpLX and mvdLX together to derive mvLX.

Merge Prediction

The merge prediction parameter derivation unit 3036 derives merge candidates including the prediction parameters (predFlagLX, mvLX, refIdxLX), and configures a merge candidate list. Furthermore, the merge prediction parameter derivation unit 3036 selects motion information (mvLXN[0], mvLXN[1]), predFlagLXN, and refIdxLXN of a merge candidate N indicated by merge_idx out of the merge candidates included in the merge candidate list as the inter prediction parameters of the target block. The merge prediction parameter derivation unit 3036 stores the selected inter prediction parameters of the merge candidate in the prediction parameter memory 307 and outputs the selected inter prediction parameters to the inter prediction image generation unit 309.

Inter Prediction Image Generation Unit 309

In a case that predMode indicates the inter prediction, the inter prediction image generation unit 309 generates a prediction image of a block or a subblock through the inter prediction by using the inter prediction parameters input from the inter prediction parameter derivation unit 303 and the reference picture.

Figure 4:
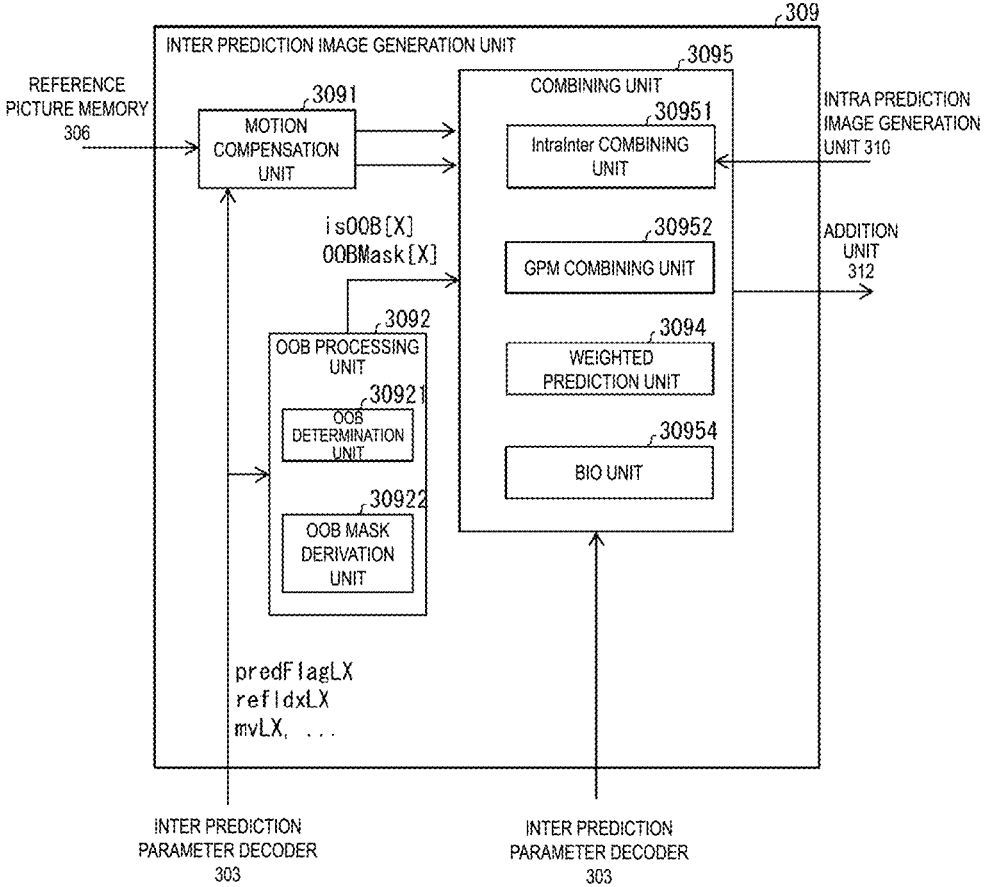
FIG. 4 is a schematic diagram illustrating a configuration of an inter prediction image generation unit.

FIG. 4 is a schematic diagram illustrating a configuration of the inter prediction image generation unit 309 included in the prediction image generation unit 308 according to the present embodiment. The inter prediction image generation unit 309 includes a motion compensation unit (prediction image generation apparatus) 3091, an OOB processing unit 3092, and a combining unit 3095. The combining unit 3095 includes a weighted prediction unit 3094.

Motion Compensation

The motion compensation unit 3091 (interpolation image generation unit 3091) generates an interpolation image (motion compensation image) by reading a reference block from the reference picture memory 306 based on the inter prediction parameters (predFlagLX, refIdxLX, and mvLX) input from the inter prediction parameter derivation unit 303. The reference block is a block located on the reference picture RefPicLX indicated by refIdxLX, at a position shifted by mvLX from the position of the target block. Here, in a case that mvLX does not have an integer precision, an interpolation image is generated by using a filter referred to as a motion compensation filter for generating pixels at the fractional positions.

The motion compensation unit 3091 derives top left coordinates (xPb, yPb) of a block having a size of bW*bH, coordinates (xL, yL) in a prediction block, and an integer position (xInt, yInt) and a phase (xFrac, yFrac) corresponding to a motion vector (mvLX[0], mvLX[1]), using the following expression (MC-P1).

$$xInt = xPb + (mvLX\,[0] >> (\log2\,(MVPREC))) + xL$$

$$xFrac = mvLX\,[0]\ \&\ (MVPREC-1)$$

$$yInt = yPb + (mvLX\,[1] >> (\log2\,(MVPREC))) + yL$$

$$yFrac = mvLX\,[1]\ \&\ (MVPREC-1)$$

Here, MVPREC indicates accuracy of mvLX (1/MVPREC pixel accuracy), log 2MVPREC=(log 2(MVPREC)), x=0, . . . , bW−1, and y=0, . . . , bH−1. For example, MVPREC may be equal to 16.

Note that, in order to perform RPR, the derivation may be performed as in (MC-P2) to be described later. Furthermore, for (xInt, yInt) derived in (MC-P1) and (MC-P2), the motion compensation unit 3091 may correct the position for wrap-around.

In a case that a flag with a subpicture boundary being a picture boundary is enabled (sps_subpic_treated_as_pic_flag==1) and the number of subpictures of a reference image is greater than 1 (sps_num_subpics_minus1 for a reference image refPicLX>0), the following holds.

```
xInt = Clip3( SubpicLeftBoundaryPos, SubpicRightBoundaryPos,
refWrapa roundEnabledFlag ? ClipH( ( PpsRefWraparoundOffset ) *
MinCbSizeY, picW, xInt ) : xInt )
yInt = Clip3( SubpicTopBoundaryPos, SubpicBotBoundaryPos, yInt )
```

Here, SubpicLeftBoundaryPos, SubpicRightBoundaryPos, SubpicTopBoundaryPos, and SubpicBottomBoundaryPos are left, right, top, and bottom boundary positions of the subpicture, respectively.

Otherwise (a case that the flag with a subpicture boundary being a picture boundary is disabled (sps_subpic_treated_as_pic_flag==0) or the number of subpictures of the reference image is 1 (sps_num_subpics_minus1 for the reference image refPicLX==0), the following holds.

```
xInt = Clip3( 0, picW ? 1, refWraparoundEnabledFlag ? ClipH
( ( PpsRefWraparoundOffset ) * MinCbSizeY, picW, xInt ) : xInt )
yInt = Clip3( 0, picH ? 1, yInt )
```

Here, the following holds: refWraparoundEnabledFlag= pps_ref_wraparound_enabled_flag && ! refPicIsScaled and PpsRefWraparoundOffset=pps_pic_width_in_luma_samples/MinCbSize Y? pps_pic_width_minus_wrap-around_offset. MinCbSizeY is a prescribed constant or variable (for example, 4), and pps_pic_width_minus_wrap-around_offset is an offset decoded from the coded data indicating the position of wrap-around.

The motion compensation unit 3091 derives a temporary image temp [ ][ ] by performing a horizontal interpolation on a reference picture refImg using an interpolation filter. In the expression below, 2 is the sum related to k of k=0, . . . , NTAP−1, mcFilter[Frac][k] is a k-th interpolation filter coefficient in the phase Frac, shift1 is a normalization parameter for adjusting a value range, and offset1=1<< (shift1−1).

$$temp\,[x]\,[y] = \left(\sum mcFilter\,[xFrac][k] * \right.$$
$$\left. refImg\,[xInt + k - NTAP/2 + 1]\,[yInt] + offset1\right) >> shift1$$

Subsequently, the motion compensation unit 3091 derives an interpolation image Pred [ ][ ] by performing a vertical interpolation processing on the temporary image temp [ ][ ]. In the expression below, 2 is the sum related to k of k=0, . . . , NTAP−1, shift2 is a normalization parameter for adjusting a value range, and offset2=1<< (shift2−1).

$$Pred\,[x]\,[y] = \left(\sum mcFilter\,[yFrac]\,[k] * \right. \qquad \text{(Expression MC-1)}$$
$$\left. temp\,[y + k - NTAP/2 + 1]\,[yInt] + offset2\right) >> shift2$$

Out-of-Picture (OOB) Processing

The OOB processing unit 3092 includes an OOB determination unit 30921 and an OOB mask derivation unit 30922. The OOB determination unit 30921 determines whether each reference block of the bi-prediction mode includes a region out of a range (Out-Of-Bouondary (OOB)) of a reference picture, based on the inter prediction parameters (predFlagLX, refIdxLX, and mvLX) input from the inter prediction parameter derivation unit 303.

Figure 9:
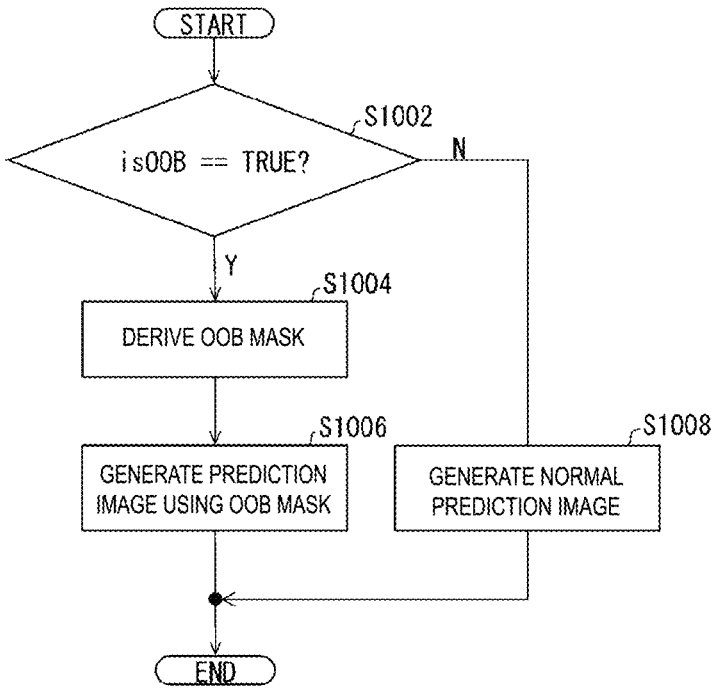
FIG. 9 is a flowchart illustrating general operation of OOB processing.

Description will be given with reference to FIG. 9.

In a case that the OOB determination unit 30921 determines that a part of pixels of the reference block is out of the picture, that is, determines that the reference block is OOB (isOOB==true, S1002), the OOB mask derivation unit 30922 derives mask data (mask value, OOB mask) indicating which region in the reference block is out of the range (S1004). The inter prediction image generation unit 309 applies the OOB mask to the OOB reference block, and generates a prediction image (S1006). The inter prediction image generation unit 309 generates a regular prediction image for the non-OOB reference block (S1008). Details will be described below.

OOB Determination Processing

In bi-prediction, for two (first and second) reference blocks, the OOB determination unit 30921 determines whether at least a part of pixels of each reference block is out of the picture (OOB). A region of an LX reference block (X=0 or 1) corresponding to the reference image refLX is represented by block top left coordinates (xRefLX, yRefLX) and a block size (a width and a height: bW, bH). The width and the height of the picture are represented by picW and picH, respectively. Note that, in the following, integer values that represent mvLX according to accuracy MVPREC of mvLX are used in the coordinate system. With the use of these values, the OOB determination unit 30921 derives a truth value isOOB[X] for representing whether the LX reference block is out of the picture, according to the following expression.

Figure 10:
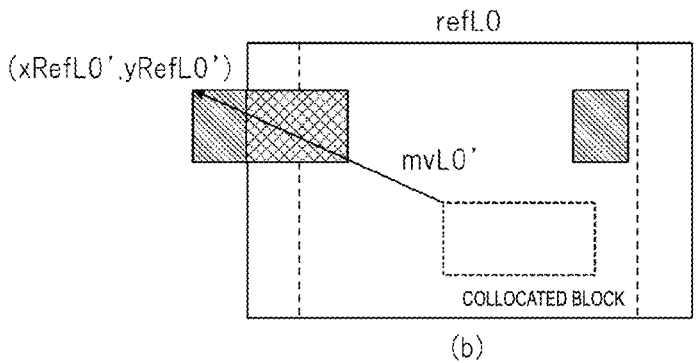
FIG. 10 is a schematic diagram illustrating an example of OOB determination processing.
Figure 10:
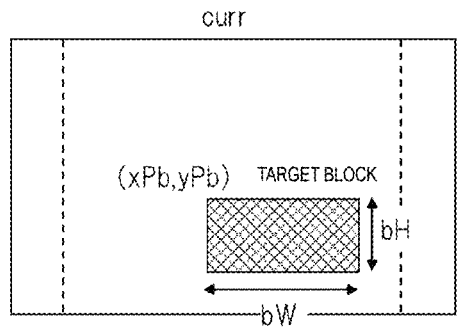
Figure 10:
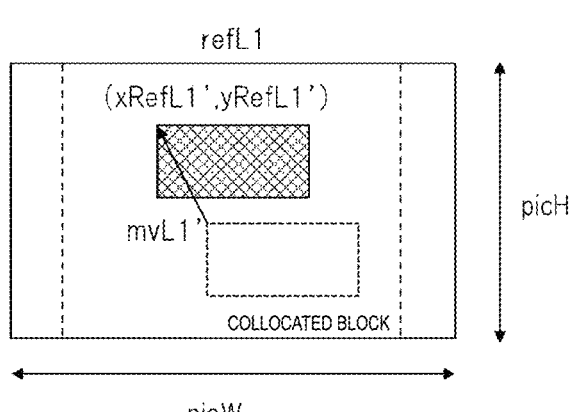

An example is illustrated in FIG. 10. FIG. 10 is a diagram in units of integers, and a motion vector mvLX' and a reference pixel position (xRefLX', yRefLX') are parameters being integer expressions of the motion vector mvLX and the reference pixel position (xRefLX, yRefLX).

$$xRefLX = (xPb << \log2MVPREC) + mvLX\,[0]$$

$$yRefLX = (yPb << \log2MVPREC) + mvLX\,[1]$$

$$picMinX = 0 - MVPREC/2$$

$$picMinY = 0 - MVPREC/2$$

$$picMaxX = ((picW - 1) << \log2MVPREC) + MVPREC/2$$

$$picMaxY = ((picH - 1) << \log2MVPREC) + MVPREC/2$$

$$isOOB\,[X] = (xRefLX <= picMinX)\,||\,(yRefLX <= picMinY)\,||$$

$$(xRefLX + (bW << \log2MVPREC) - 1) >= picMaxX)\,||$$

$$(yRefLX + (bH << \log2MVPREC) - 1) >= picMaxY)$$

picMinX, picMinY, picMaxX, and picMaxY are minimum coordinates and maximum coordinates of the picture expressed in accuracy of mvLX. log 2MVPREC bit left shift ("<<log 2MVPREC") may be processed with multiplication ("* MVPREC") by MVPREC, or "* MVPREC" to be described later may be processed with "<<log 2MVPREC".

Configuration Example 1

The OOB determination unit 30921 of the present configuration example determines whether the target block is a target of OOB processing, including determination as to whether the wrap-around processing is applied to the target picture. Similarly, determination as to whether the reference block is the target of the OOB processing may be performed by using presence or absence of the wrap-around processing to be applied to the reference picture including the reference block. A syntax element pps_ref_wraparound_enabled_flag signaled in the PPS is a flag indicating whether or not wrap-around motion compensation in the horizontal direction is available. In a case that pps_ref_wraparound_enabled_flag is true (1), it is indicated that the wrap-around processing on the reference picture is applied (enabled) in the target picture. In a case that the wrap-around processing is enabled, the OOB determination unit 30921 sets isOOB [X]=false.

```
if (pps_ref_wraparound_enabled_flag == true) {
    isOOB[X] = false
} else {
    xRefLX = (xPb<<log2MVPREC) + mvLX[0]
    yRefLX = (yPb<<log2MVPREC) + mvLX[1]
    picMinX = 0 – MVPREC/2
    picMinY = 0 – MVPREC/2
    picMaxX = ((picW–1)<<log2MVPREC) + MVPREC/2
    picMaxY = ((picH–1)<<log2MVPREC) + MVPREC/2
    isOOB[X] =  (xRefLX <= picMinX) || (yRefLX <= picMinY) ||
                (xRefLX + (bW<<log2MVPREC) –1) >= picMaxX) ||
                (yRefLX + (bH<<log2MVPREC) –1) >= picMaxY)
}
```

Alternatively, determination may be performed using a logical expression of the OOB determination processing, instead of a conditional branch.

$$isOOB\,[X] = (pps\_ref\_wraparound\_enabled\_flag == false)\ \&\&$$

$$((xRefLX <= picMinX)\,||\,(yRefLX <= picMinY)\,||$$

$$(xRefLX + (bW << \log2MVPREC) - 1) >= picMaxX)\,||$$

$$(yRefLX + (bH << \log2MVPREC) - 1) >= picMaxY))$$

In the above example, presence or absence of the wrap-around processing is determined using pps_ref_wraparound_enabled_flag, but this is not restrictive. Another variable or function value, for example, refWraparoundEnabledFlag, which is derived by using presence or absence of the wrap-around processing in the target picture, may be used (the same applies to the following configurations).

According to the above configuration, there is an effect that reduction in coding efficiency due to wrap-around processing with inappropriate OOB processing can be forestalled, and increase in the amount of calculation in generation of a prediction image can be moderated.

Configuration Example 2

The OOB determination unit 30921 may change an OOB determination method, depending on whether the wrap-around processing is applied in the target picture. Similarly, determination as to whether the reference block is the target of the OOB processing may be performed by using presence or absence of the wrap-around processing to be applied to the reference picture including the reference block. For example, the wrap-around processing in the VVC is limited to the horizontal direction, and thus in a case that the wrap-around processing is enabled, for example, isOOB[X] is derived by comparing only the coordinates in the vertical direction being out of the target of the wrap-around processing as follows. On the contrary, in a case that the wrap-around processing is disabled, isOOB[X] is derived by comparing the coordinates in both of the vertical direction and the horizontal direction (X=0, 1).

```
xRefLX = (xPb<<log2MVPREC) + mvLX[0]
yRefLX = (yPb<<log2MVPREC) + mvLX[1]
picMinX = 0 – MVPREC/2
picMinY = 0 – MVPREC/2
picMaxX = ((picW–1)<<log2MVPREC) + MVPREC/2
picMaxY = ((picH–1)<<log2MVPREC) + MVPREC/2
if (pps_ref_wraparound_enabled_flag == true) {
    isOOB[X] =   (yRefLX <= picMinY) ||
                 (yRefLX + (bH<<log2MVPREC) –1) >= picMaxY)
} else {
    isOOB[X] =   (xRefLX <= picMinX) || (yRefLX <= picMinY) ||
                 (xRefLX + (bW<<log2MVPREC) –1) >= picMaxX) ||
                 (yRefLX + (bH<<log2MVPREC) –1) >= picMaxY)
}
```

Alternatively, determination may be performed using a logical expression of the OOB determination processing, instead of a conditional branch.

$$isOOB\,[X] =$$

$$((pps\_ref\_wraparound\_enabled\_flag == false)\ \&\&\ ((xRefLX <= picMinX)$$

$$||\,((xRefLX + (bW << \log2MVPREC) - 1) >= picMaxX)\,||\,(yRefLX <=$$

$$picMinY\,||\,((yRefLX + (bH << \log2MVPREC) - 1) >= picMaxY)))$$

According to the above configuration, there is an effect that, even in a case that the wrap-around processing is enabled, the OOB processing can be used together, and coding efficiency can be enhanced.

Configuration Example 3

Regarding the reference picture to which reference picture resampling (RPR) processing is applied, the OOB determination unit 30921 of the present configuration example corrects coordinates thereof on a prescribed scale and then performs the OOB determination processing. Specifically, the coordinates are corrected as follows.

Instead of (MC-P1) described above, the motion compensation unit 3091 derives luma coordinates (refxSbL, refySbL) and (refxL, refyL) indicated by the motion vector refMvLX as follows (MC-P2).

$$refxSbL =$$
$$(((xPb - (SubWidthC * \text{pps\_scaling\_win\_left\_offset})) << \log2MVPREC) +$$
$$refMvLX[0]) * scalingRatio[0]$$
$$refxL = ((\text{sign}(refxSbL) * ((\text{abs}(refxSbL) + offsetP1) >> shiftP1) +$$
$$xL * ((scalingRatio[0] + offsetP2) >> shiftP2)) +$$
$$fRefLeftOffset + offsetP3) >> shiftP3$$
$$refySbL =$$
$$(((yPb - (SubHeightC * \text{pps\_scaling\_win\_top\_offset})) << \log2MVPREC) +$$
$$refMvLX[1]) * scalingRatio[1]$$
$$refyL = ((\text{sign}(refySbL) * ((\text{abs}(refySbL) + offsetP1) >> shiftP1) +$$
$$yL * ((scalingRatio[1] + offsetP2) >> shiftP2)) +$$
$$fRefTopOffset + offsetP3) >> shiftP3$$

Here, offsetP1=(1<<(shiftP1−1)), offsetP2=(1<<(shift2−1), and offsetP3=(1<<(shiftP3−1). For example, shiftP1=8, shiftP2=4, shiftP3=6, and offsetP1, offsetP2, and offsetP3=128, 8, and 6.

$$xInt = refxL >> \log2MVPREC$$
$$xFrac = refxL \& (MVPREC - 1)$$
$$yInt = refyL >> \log2MVPREC$$
$$yFrac = refyL \& (MVPREC - 1)$$

Here, SubWidthC and SubHeightC are values determined by a sampling method of a chroma format, and are ratios of the width and the height of chroma pixels to the width and the height of luma pixels. Derivation may be performed as follows by decoding a syntax element sps_chroma_format_idc in coded data. sps_chroma_format_idc is a parameter indicating the chroma format.

In a case that sps_chroma_format_idc=0 (Monocrome), SubWidthC=1 and SubHeightC=1

In a case that sps_chroma_format_idc=1 (4:2:0), SubWidthC=2 and SubHeightC=2

In a case that sps_chroma_format_idc=2 (4:2:2), SubWidthC=2 and SubHeightC=1

In a case that sps_chroma_format_idc=3 (4:4:4), SubWidthC=1 and SubHeightC=1 pps_scaling_win_left_offset, pps_scaling_win_top_offset, pps_scaling_win_right_offset, and pps_scaling_win_bottom_offset are offset values to be applied in a case of scaling. refMvLX (X=0, 1) is a motion vector in the reference picture, and accuracy is MVPREC (1/MVPREC). scalingRatio[0] and scalingRatio[1] are horizontal and vertical scaling factors of the reference picture for the target picture, respectively.

$$scalingRatio[0] = ((fRefWidth << 14) + (CurrPicScalWinWidthL >> 1))$$
$$/CurrPicScaLWinWidthL$$
$$scalingRatio[1] = ((fRefHeight << 14) + (CurrPicScalWinHeightL >> 1))$$
$$/CurrPicScaLWinHeightL$$
$$CurrPicScalWinWidthL = \text{pps\_pic\_width\_in\_luma\_samples} ? SubWidthC *$$
$$(\text{pps\_scaling\_win\_right\_offset} + \text{pps\_scaling\_win\_left\_offset})$$
$$CurrPicScalWinHeightL =$$
$$\text{pps\_pic\_height\_in\_luma\_samples} ? SubHeightC *$$
$$(\text{pps\_scaling\_win\_bottom\_offset} + \text{pps\_scaling\_win\_top\_offset})$$

fRefWidth is CurrPicScalWinWidthL of a j-th reference picture of RefPicListX, and fRefHeight is CurrPicScalWinHeightL of a j-th reference picture of RefPicListX. pps_pic_width_in_luma_samples and pps_pic_height_in_luma_samples are the width and the height of the picture.

fRefLeftOffset and fRefTopOffset are values set as follows.

$$fRefLeftOffset = (SubWidthC * \text{pps\_scaling\_win\_left\_offset}) << 10)$$
$$fRefTopOffset = (SubHeightC * \text{pps\_scaling\_win\_top\_offset}) << 10)$$

xL and yL are relative coordinates with top left coordinates of the reference block being (0, 0).

The OOB determination unit 30921 derives (xRefLX, yRefLX) as (refxL, refyL) derived using (xL, yL)=(0, 0) as top left coordinates of the reference block in the reference picture in a case that scaling using RPR processing is not performed.

$$xRefLX = refxL =$$
$$((\text{sign}(refxSbL) * ((\text{abs}(refxSbL) + 128) >> 8)) + fRefLeftOffset + 32) >> 6$$
$$yRefLX = refyL =$$
$$((\text{sign}(refySbL) * ((\text{abs}(refySbL) + 128) >> 8)) + fRefTopOffset + 32) >> 6$$

The width bW and the height bH of the reference block with corrected scaling using RPR processing are derived according to the following expressions, respectively.

$$bW = sbWidth * ((scalingRatio[0] + 8) >> 4)$$
$$bH = sbHeight * ((scalingRatio[1] + 8) >> 4)$$

Note that the method of correction is not limited to the above expressions. Another method may be used as long as the method is a method for scaling the coordinate system by at least using the scaling factors scalingRatio of the RPR processing.

The OOB determination unit 30921 performs determination as to whether the reference block is OOB, using the coordinates (xRefLX, xRefLY) corrected by scaling as described above.

$$picMinX = 0 - MVPREC/2$$

$$picMinY = 0 - MVPREC/2$$

$$picMaxX = ((picW - 1) << log2MVPREC) + MVPREC/2$$

$$picMaxY = ((picH - 1) << log2MVPREC) + MVPREC/2$$

$$isOOB[X] = ((xRefLX <= picMinX) \| (yRefLX <= picMinY) \|$$

$$(xRefLX + (bW << log2MVPREC) - 1) >= picMaxX) \|$$

$$(yRefLY + (bH << log2MVPREC) - 1) >= picMaxY)$$

According to the above configuration, the RPR processing and the OOB processing can be simultaneously applied. In other words, the OOB determination processing is performed on the reference picture to which the RPR processing is applied based on scaled coordinates, and therefore there is an effect that coding efficiency can be enhanced by using the OOB processing.

Configuration Example 4

Configuration example 4 will describe an example in which the OOB processing is not performed in the reference picture to which the RPR processing is applied. The OOB determination unit 30921 of the present configuration example determines whether the target block is a target of OOB processing, including determination as to whether the reference picture resampling (RPR) processing is applied.

```
if (refPicIsScaled == true) {
    isOOB[X] = false
} else {
    isOOB[X] =    (xRefLX <= picMinX) || (yRefLX <= picMinY) ||
                  (xRefLX + (bW<<log2MVPREC) −1) >= picMaxX) ||
                  (yRefLX + (bH<<log2MVPREC) −1) >= picMaxY)
}
```

Alternatively, determination may be performed using a logical expression of the OOB determination processing, instead of a conditional branch.

$$isOOB[X] =$$

$$! \, refPicIsScaled \, \&\& \, ((xRefLX <= picMinX) \| (yRefLX <= picMinY) \|$$

$$(xRefLX + (bW << log2MVPREC) - 1) >= picMaxX) \|$$

$$(yRefLX + (bH << log2MVPREC) - 1) >= picMaxY))$$

Here, refPicIsScaled is a variable to be true in a case that the RPR processing is enabled in the reference picture and sizes of the target picture and the reference picture are different. Derivation may be performed as follows. refPicIsScaled[i][j]=(pps_pic_width_in_luma_samples !=refPicWidth‖pps_pic_height_in_luma_samples !=refPicHeight‖pps_scaling_win_left_offset !=refScaling WinLeftOffset‖pps_scaling_win_right_offset !=refScalingWinRightOffset‖pps_scaling_win_top_offset !=refScalingWinTopOffset‖pps_scaling_win_bottom_offset !=refScaling WinBottomOffset‖sps_num_subpics_minus1 !=fRefNumSubpics) sps_num_subpics_minus1+1 and fRefNumSubpics respectively indicate the number of subpictures of the target picture and the number of subpictures of the reference picture, refPic Width and refPicHeight respectively indicate the width and the height of the reference picture, and refScalingWinLeftOffset, refScalingWinRightOffset, refScalingWinTopOffset, and refScalingWinBottomOffset indicate offsets of the reference picture.

According to the above configuration, there is an effect that the OOB processing is not applied to the reference picture to which the RPR processing is applied and thus the amount of calculation can be reduced in generation of a prediction image.

Configuration Example 5

The present configuration example will describe a case that both of the wrap-around processing and the reference picture resampling processing are available. The OOB determination unit 30921 of the present configuration example determines whether the target block is a target of OOB processing, including determination as to whether the wrap-around processing is applied in the target picture and determination as to whether the reference picture resampling (RPR) processing is applied.

```
if (pps_ref_wraparound_enabled_flag || refPicIsScaled) {
    isOOB[X] = false
} else {
    xRefLX = (xPb<<log2MVPREC) + mvLX[0]
    yRefLX = (yPb<<log2MVPREC) + mvLX[1]
    picMinX = 0 − MVPREC/2
    picMinY = 0 − MVPREC/2
    picMaxX = ((picW−1)<<log2MVPREC) + MVPREC/2
    picMaxY = ((picH−1)<<log2MVPREC) + MVPREC/2
    isOOB[X] =   (xRefLX <= picMinX) || (yRefLX <= picMinY) ||
                 (xRefLX + (bW<<log2MVPREC) −1) >= picMaxX) ||
                 (yRefLX + (bH<<log2MVPREC) −1) >= picMaxY)
}
```

Alternatively, determination may be performed using a logical expression of the OOB determination processing, instead of a conditional branch.

$$isOOB[X] = (! \, refWraparoundEnabledFlag \, \&\& \, ! \, refPicIsScaled) \, \&\&$$

$$((xRefLX <= picMinX) \| (yRefLX <= picMinY) \|$$

$$(xRefLX + (bW << log2MVPREC) - 1) >= picMaxX) \|$$

$$(yRefLX + (bH << log2MVPREC) - 1) >= picMaxY))$$

According to the above configuration, in a case that both of the wrap-around processing and the reference picture resampling processing are available and one of the processings is applied, the OOB processing is not performed. Therefore, there is an effect that increase in the amount of calculation in generation of a prediction image can be moderated. Note that the present configuration example is not restrictive, and the OOB determination unit 30921 may include another combination of configuration example 1 or 2 and configuration example 3 or 4.

OOB Mask Derivation Processing

The OOB mask derivation unit 30922 derives the OOB mask (OOBMask[X]) for the reference block. OOBMask[X] is a binary image (mask) having bW×bH pixels. In a case that a value of OOBMask[X][px][py] (px=0, . . . , bW−1, py=0, . . . , bH−1) is 0 (false), it is indicated that the pixel (px, py) is inside the picture, and in a case that the value is 1 (true), it is indicated that the pixel (px, py) is out of the picture. Note that false and true are not limited to 0 and 1, and other values may be used, such as binary bit mask values "0000000000b" and "1111111111b" including a string of 0 or 1 and having a length of BitDepth or longer, for example. Alternatively, hexadecimal numbers of "000", "3FF", "000", "FFF", "0000", and "FFFF" may be used. The OOB mask derivation unit 30922 sets all of the values of OOB-Mask[X] equal to false for a block determined as not an OOB processing target (isOOB[X]==false) by the OOB determination unit 30921. The OOB mask derivation unit 30921 derives the mask by using the following expression for a block determined as an OOB processing target (isOOB [X]==true) by the OOB determination unit 30921. Note that a sign of inequality (">=" or "<=") need not include a sign of equality (">" or "<").

---

OOBMask[X][px][py] = (((xRefLX >> log2MVPREC) + px <= (picMinX >> log 2MVPREC)) || ((yRefLX >> log2MVPREC) + py <= (picMinY >> log2MVPREC))
   ||
   ((xRefLX >> log2MVPREC) + px >= (picMaxX >> log
   2MVPREC)) || ((yRefLX >> log2MVPREC) + py >= (picMaxY >> log2MVPREC)))
   ? 1 : 0
or
   OOBMask[X][px][py] = ((xRefLX + (px<<log2MVPREC) <= picMinX) || (yRefLX +
   (py<<log2MVPREC) <= picMinY)) ||
   ((xRefLX + (px<<log2MVPREC) >= picMaxX) || (yRefLX +
   (py<<log2MVPREC) >= picMaxY)) ? 1 : 0

---

Note that px = 0, ..., bW − 1 and py = 0, ..., bH − 1.

---

Generation of OOB Prediction Image

In a case of bi-prediction, the motion compensation unit 3091 (interpolation image generation unit 3091) sets Pred [ ][ ] derived in the above (Expression MC-1) as interpolation images PredL0[ ][ ] and PredL1[ ][ ] for each L0 list and L1 list, respectively. Then, the motion compensation unit 3091 (interpolation image generation unit 3091) generates an interpolation image Pred[ ][ ] from PredL0[ ][ ] and PredL1[ ][ ]. In a case that the reference block of the bi-prediction is a target of the OOB processing, OOBMask[X] corresponding to the reference block is used in generation of the prediction image. In this case, Pred[ ][ ] is derived as follows.

--- if (OOBMask[0][px][py] && !OOBMask[1][px][py]) { (Expression WP-1)
Pred[px][py] = (PredL1[px][py] + offset1) >> shift1
} else if (!OOBMask[0][px][py] && OOBMask[1][px][py]) {
Pred[px][py] = (PredL0[px][py] + offset1) >> shift1
} else {
Pred[px][py] = (PredL0[px][py] + PredL1[px][py] + offset2) >> shift2
}

---

Here, px=0, . . . , bW−1 and py=0, . . . , bH−1. shift1=Max(2, 14-bitDepth), shift2=Max(3, 15-bitDepth), offset1=1<<

(shift1−1), and offset2=1<<(shift2−1). Note that shift1 is shift (for example, 14-bitDepth) for restoring interpolation image bit depth (for example, 14 bits) back to the original bit depth. shift2 is a right shift amount serving as an average simultaneously with restoring back to the original bits, and offset1 and offset2 are rounding values in a case that right shift is performed by shift1 and shift2, respectively.

Note that the above processing may be switched depending on whether explicit bi-prediction with CU-level Weights (BCW) or combined inter-intra prediction CIIP (combined inter-picture merge and intra-picture prediction) is used. bcwIndex is an index indicating the weight of BCW. ciip_ flag is a flag indicating on or off of CIIP. In a case that bcwIndex==0 or the CIIP flag (ciip_flag) is 1, the processing of the above (Expression WP-1) is performed. In other cases, the following processing is performed. w1=bcwWLut [bcwIdx]

--- w0 = (8 − w1)
Here, bcwWLut[k] = {4, 5, 3, 10, −2}
   if (OOBMask[0][px][py] && !OOBMask[1][px][py]) {
      Pred[px][py] = (PredL1[px][py] + offset1)>> shift1
   } else if (!OOBMask[0][px][py] && OOBMask[1][px][py]) {
      Pred[px][py] = (PredL0[px][py] + offset1)>> shift1
   } else {
      Pred[px][py] = ( w0 * PredL0[px][py] + w1 * PredL1[px][py] + offset
   3 )>>(shift1+3))
   }
Here, offset3 = 1 << (shift1 + 2).

---

In a case that processing is performed as follows by combining processing using the flag predFlagLX indicating whether the LX reference picture is used in units of blocks and OOBMask into one branch, there is an effect that the amount of processing can be reduced.

--- if ((predFlagL0 == 1 && predFlagL1 == 0) || (!OOBMask[0][px][py] &&
OOBMask[1][px][py])) { (Expression WP-2)
Pred[px][py] = (PredL0[px][py] * we0 + offset1) >> shift1
} else if ((predFlagL0 == 0 && predFlagL1 == 1) || OOBMask[0][px][py]
&& !OOBMask[1][px][py]) {
Pred[px][py] = (PredL1[px][py] * we1 + offset1) >> shift1
} else if ((bcwIdx == 0 || ciip_flag == 1) {
Pred[px][py]= (w0 * PredL0[px][py] + w1 * PredL1[px][py] + offset2) >> shift2
} else { // bcwIdx != 0 and ciip_flag == 0)
Pred[px][py] = (we0 * PredL0[px][py] + we1 * PredL1[px][py] + offset3) >> (shift1 + 3))
}
Here, we0 = we1 = 1/2 may hold.
Exclusive Configuration

---

In a case that the above exclusive configuration is used, OOBMask[0] and OOBMask[1] are not set equal to 1 together, and thus the motion compensation unit 3091 (interpolation image generation unit 3091) can derive the interpolation image according to the following branch processing.

```
if (OOBMask[0][px][py]) {
    Pred[px][py] = (PredL1[px][py] + offset1)>> shift1
} else if (OOBMask[1][px][py]) {
    Pred[px][py] = (PredL0[px][py] + offset1)>> shift1
} else {
    Pred[px][py] = (PredL0[px][py] + PredL1[px][py] + offset2)>> shift2
}
```

It is appropriate that PredL0, PredL1, and PredBI be calculated in advance, and final Pred be derived in the following mask processing.

First, PredL0, PredL1, and PredBI are calculated.

$$PredL0[px][py] = (PredL0[px][py] + \textit{offset}1) >> \textit{shift}1$$

$$PredL1[px][py] = (PredL1[px][py] + \textit{offset}1) >> \textit{shift}1$$

$$PredBI[px][py] = (PredL0[px][py] + PredL1[px][py] + \textit{offset}2) >> \textit{shift}2$$

Next, in a case that binary bit masks of "1111111111b" and "0000000000b" having a BitDepth length are used as values of OOBMask[0][px][py] and OOBMask[1][px][py], final Pred is derived according to the following processing.

$$Pred[px][py] =$$

$$(PredBI[px][py] \ \& \ (\tilde{} OOBMask[0][px][py] \ \& \ \tilde{} OOBMask[1][px][py])) +$$

$$(PredL0[px][py] \ \& \ \tilde{} OOBMask[0][px][py]) +$$

$$(PredL1[px][py] \ \& \ \tilde{} OOBMask[1][px][py])$$

Note that, in a case that true has a value of 1 and false has a value of 0, bit mask values "0000000000b" and "1111111111b" may be generated from 0 and 1, and the following processing may be used. Here, "+" may be "I" (the same applies to mask operation processing in the description below)

$$Pred[px][py] = (\text{Expression } \textit{excl}{-}1)(PredBI[px][py] \ \&$$

$$(0 - ((! \ OOBMask[0][px][py] \ \& \ !OOBMask[1][px][py])?1:0))) +$$

$$(PredL0[px][py] \ \& \ (0 - ((! \ OOBMask[0][px][py]?1:0))) +$$

$$(PredL1[px][py] \ \& \ (0 - (! \ OOBMask[1][px][py]?1:0)))$$

In order to create the mask having a bit width of at least a bit depth of a pixel value, the above expression includes calculation of converting the binary (0 or 1) mask into 0 (all of the bits are 0, the pixel value is invalidated) or into −1 (all of the bits are 1, the pixel value is validated).

Derivation of the prediction image is not limited thereto, and such calculation may be used that a term invalidated due to the OOB mask among three terms corresponding to PredBI, PredL0, and PredL1 is set equal to 0. For example, in a case that the bit depth of the pixel value is at most 16 bits, the following expression may be used.

$$Pred[px][py] = (PredBI[px][py] \ \&$$

$$((! \ OOBMask[0][px][py] \ \& \ !OOBMask[1][px][py])?0 \times FFFF : 0)) +$$

$$(PredL0[px][py] \ \& (! \ OOBMask[0][px][py]?0 \times FFFF : 0)) +$$

$$(PredL1[px][py] \ \& (! \ OOBMask[1][px][py]?0 \times FFFF : 0))$$

Without the use of addition in combination of three terms, bitwise OR may be used as follows.

$$Pred[px][py] = (PredBI[px][py] \ \&$$

$$((! \ OOBMask[0][px][py] \ \& \ !OOBMask[1][px][py])?0 \times FFFF : 0))$$

$$|(PredL0[px][py] \ \& (! \ OOBMask[0][px][py]?0 \times FFFF : 0))|$$

$$(PredL1[px][py] \ \& (! \ OOBMask[1][px][py]?0 \times FFFF : 0))$$

Alternatively, multiplication may be used.

$$Pred[px][py] = (PredBI[px][py] *$$

$$((! \ 00BMask[\emptyset][px][py] \ \& !00BMask[1][px][py])?1: \ \emptyset)) +$$

$$(PredL\emptyset[px][py] * (! \ 00BMask[\emptyset][px][py]?1: \ \emptyset)) +$$

$$(PredL1[px][py] * (! \ 00BMask[1][px][py]?1: \ \emptyset))$$

According to the above, exclusive processing can be simplified. By using the exclusive processing, processing can be further simplified than operation of (Expression excl-1).

The motion compensation unit 3091 (interpolation image generation unit 3091) may refer to the value of isOOB and separate processing in advance. For example, the following may be performed. In this manner, in a case that isOOB[X] is set equal to false, there is no need to refer to OOBMask [X][px][py] for each pixel, and thus there is an effect that the amount of calculation can be reduced.

```
if (isOOB[0] && !isOOB[1]) {
    if (OOBMask[0][px][py]) {
        Pred[px][py] = (PredL1[px][py] + offset1)>> shift2
    } else {
        Pred[px][py] = (PredL0[px][py] + PredL1[px][py] + offset2)>> shift
    }
} else if (!isOOB[0] && isOOB[1]) {
    if (OOBMask[1][px][py]) {
        Pred[px][py] = (PredL0[px][py] + offset1)>> shift2
    } else {
        Pred[px][py] = (PredL0[px][py] + PredL1[px][py] + offset2)>> shift
    }
} else if (isOOB[0] && isOOB[1]) {
    if (OOBMask[0][px][py] && !OOBMask[1][px][py]) {
        Pred[px][py] = (PredL1[px][py] + offset1)>> shift2
    } else if (!OOBMask[0][px][py] && OOBMask[1][px][py]) {
        Pred[px][py] = (PredL0[px][py] + offset1)>> shift2
    } else {
        Pred[px][py] = (PredL0[px][py] + PredL1[px][py] + offset2)>> shift
    }
} else {
    Pred[px][py] = (PredL0[px][py] + PredL1[px][py] + offset2)>> shift
}
```

Weighted Prediction

The weighted prediction unit 3094 generates a prediction image of a block by multiplying an interpolation image PredLX by a weight coefficient.

The inter prediction image generation unit 309 outputs the generated prediction image of the block to the addition unit 312.

Configuration of Video Coding Apparatus

Figure 7:
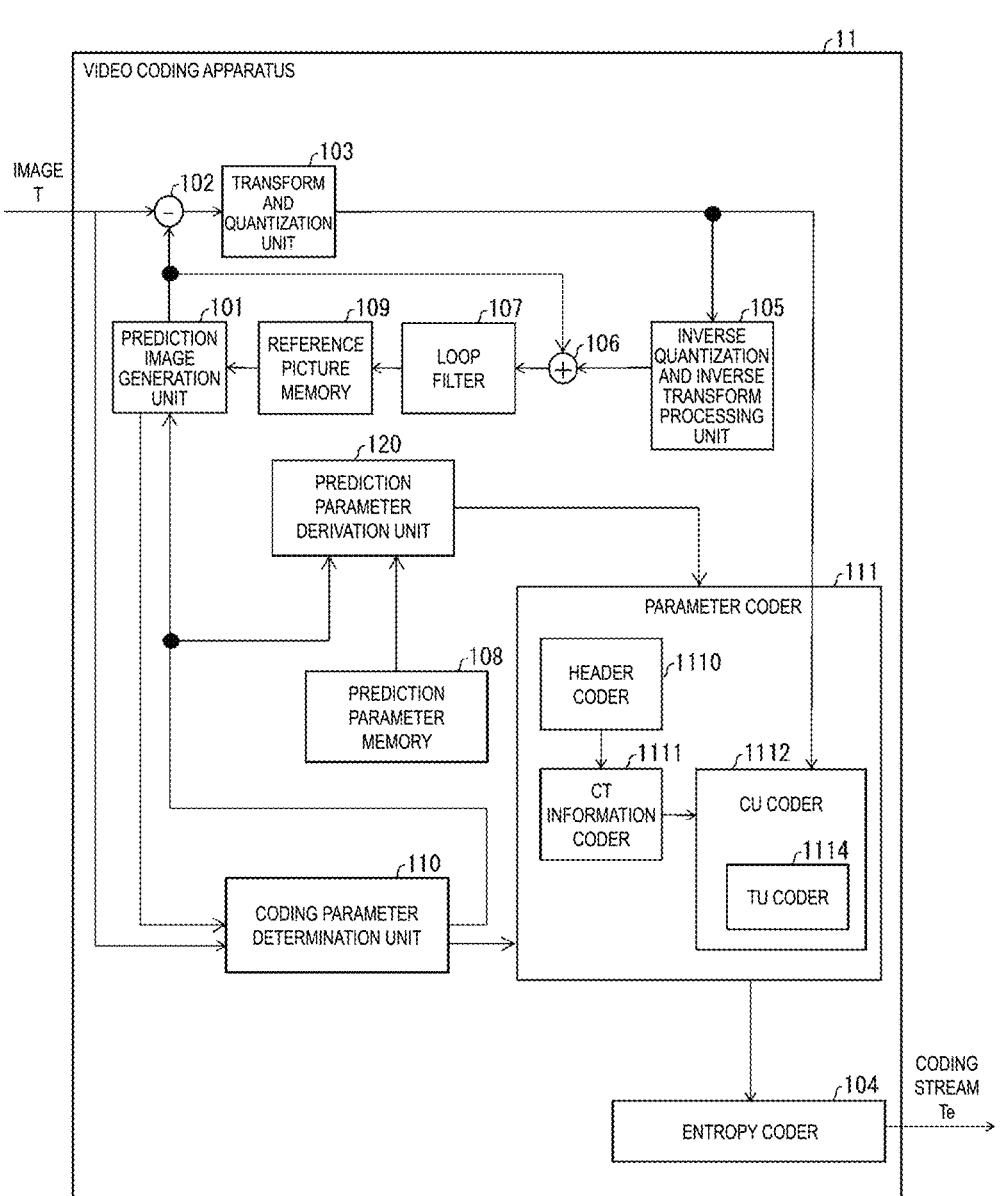
FIG. 7 is a block diagram illustrating a configuration of a video coding apparatus.
Figure 8:
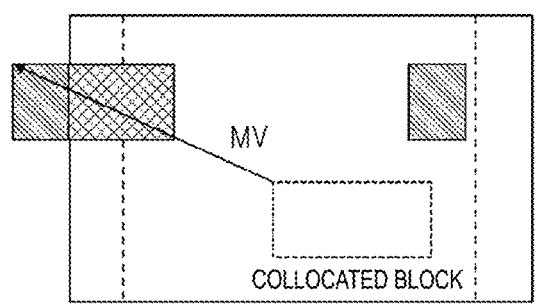
FIG. 8 is a diagram illustrating an example of wrap-around processing and reference picture resampling processing of related art.
Figure 8:
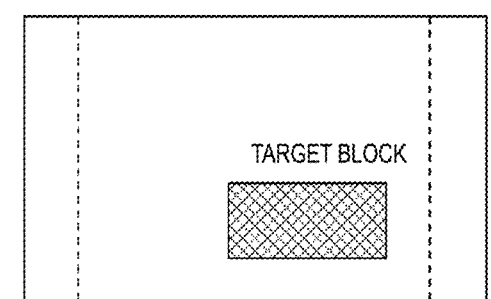
Figure 8:
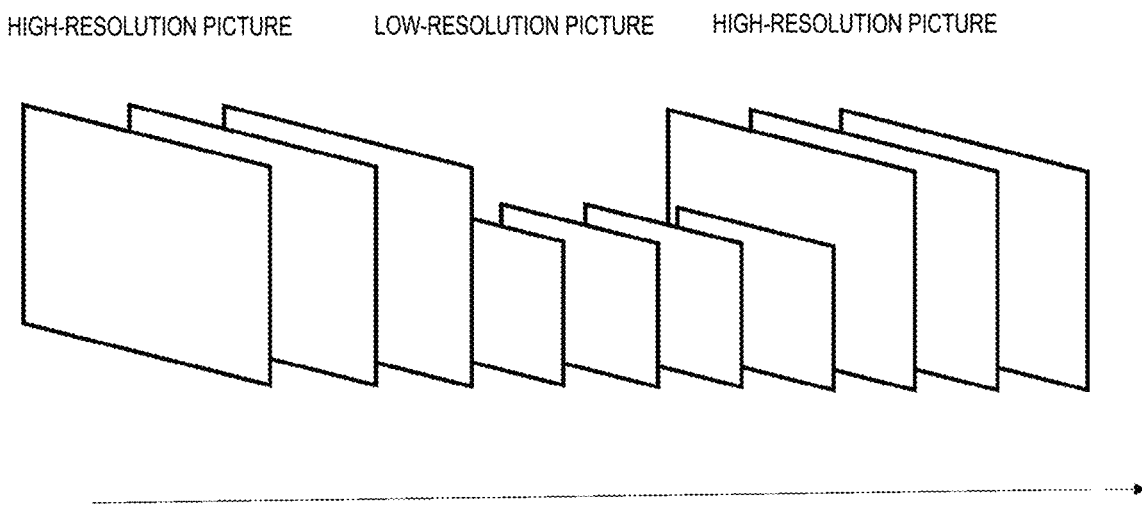

Next, a configuration of the video coding apparatus 11 according to the present embodiment will be described. FIG. 7 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit already described, and description of these units is omitted.

The subtraction unit 102 subtracts a pixel value of the prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The transform and quantization unit 103 includes a separable transform processing unit (first transform processing unit), a non-separable transform processing unit (second transform processing unit), and a scaling unit.

The separable transform processing unit applies the separable transform to a prediction error. The scaling unit performs scaling for a transform coefficient using a quantization matrix.

The inverse quantization and inverse transform processing unit 105 is the same as the inverse quantization and inverse transform processing unit 311 of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as the inter prediction parameters (predMode, general_merge_flag, merge_idx, inter_pred_idc, refIdxLX, mvp_LX_idx, and mvdLX), the intra prediction parameters, and the quantized transform coefficients.

The parameter coder 111 inputs the quantized transform coefficients and the coding parameters (split information and prediction parameters) to the entropy coder 104. The entropy coder 104 entropy-codes the quantized transform coefficients and the coding parameters to generate and output a coding stream Te.

The prediction parameter derivation unit 120 is a means including the inter prediction parameter coder 112 and the intra prediction parameter coder, and derives an intra prediction parameter and an inter prediction parameter from the parameters input from the coding parameter determination unit 110. The derived intra prediction parameter and inter prediction parameter are output to the parameter coder 111.

Configuration of Inter Prediction Parameter Coder

The inter prediction parameter coder 112 includes a parameter coding controller 1121 and an inter prediction parameter derivation unit 303. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder

The intra prediction parameter coder includes a parameter coding controller and an intra prediction parameter derivation unit. The intra prediction parameter derivation unit has a configuration common to the video decoding apparatus.

However, unlike in the video decoding apparatus, the coding parameter determination unit 110 and the prediction parameter memory 108 provide input to the inter prediction parameter derivation unit 303 and the intra prediction parameter derivation unit, and the input is output to the parameter coder 111.

The addition unit 106 adds, for each pixel, the pixel value for the prediction block input from the prediction image generation unit 101 and the prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The prediction parameter memory 108 stores the prediction parameters generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set among multiple sets of coding parameters. The coding parameters include QT, BT, or TT split information described above, a prediction parameter, or a parameter to be coded which is generated in relation to the aforementioned elements. The prediction image generation unit 101 generates a prediction image by using these coding parameters.

The coding parameter determination unit 110 calculates an RD cost value indicating the magnitude of an amount of information and a coding error for each of the multiple sets. The RD cost value is, for example, the sum of an amount of code and the value obtained by multiplying a square error by a coefficient 2. The code amount is an amount of information of the coding stream Te obtained by performing entropy coding on a quantization error and a coding parameter. The square error is the square sum of prediction errors calculated by the subtraction unit 102. The coefficient 2 is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" described here refers to a computer system built into either the video coding apparatus 11 or the video decoding apparatus 31 and is assumed to include an OS and hardware components such as a peripheral apparatus. In addition, the "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. In addition, the above-described program may be one for implementing some of the above-described functions, and also may be one capable of implementing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. In addition, the circuit integration technique is not limited to LSI, and implementation as a dedicated circuit or a multi-purpose processor may be adopted. In addition, in a case that a circuit integration technology that replaces LSI appears as the semiconductor technologies advance, an integrated circuit based on that technology may be used.

Although embodiments of the present invention have been described above in detail with reference to the drawings, the specific configurations thereof are not limited to those described above and various design changes or the like can be made without departing from the spirit of the invention.

An embodiment of the present invention is not limited to the embodiments described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiments of the present invention can be preferably applied to a video decoding apparatus for decoding coded data in which image data is coded, and a video coding apparatus for generating coded data in which image data is coded. In addition, the embodiments of the present invention can be preferably applied to a data structure of coded data generated by the video coding apparatus and referred to by the video decoding apparatus.

CROSS-REFERENCE TO RELATED APPLICATION

The present application claims priority of JP 2022-108070, filed on Jul. 5, 2022, and all the contents thereof are included herein by the reference.

REFERENCE SIGNS LIST

31 Video decoding apparatus
301 Entropy decoder
302 Parameter decoder
3022 CU decoder
3024 TU decoder
303 Inter prediction parameter derivation unit
305, 107 Loop filter
306, 109 Reference picture memory
307, 108 Prediction parameter memory
308, 101 Prediction image generation unit
309 Inter prediction image generation unit
3092 OOB processing unit
30921 OOB determination unit
30922 OOB mask derivation unit
311, 105 Inverse quantization and inverse transform processing unit
312, 106 Addition unit
320 Prediction parameter derivation unit
11 Video coding apparatus
102 Subtraction unit
103 Transform and quantization unit
104 Entropy coder
110 Coding parameter determination unit
111 Parameter coder
112 Inter prediction parameter coder
120 Prediction parameter derivation unit

The invention claimed is:

1. A video decoding apparatus comprising an OOB determination unit configured to determine whether a reference block is targeted for OOB processing by comparing coordinates of the reference block with coordinates of a picture, and an OOB mask derivation unit configured to derive mask data representing availability of each pixel by comparing coordinates of pixels included in the reference block with coordinates of the picture plus offset, wherein the OOB determination unit determines whether the reference block is targeted for the OOB processing by using presence or absence of processing to be applied to a reference picture including the reference block.

2. The video decoding apparatus according to claim 1, wherein the OOB determination unit determines whether the reference block is targeted for the OOB processing by using presence or absence of reference picture resampling processing to be applied to the reference picture including the reference block.

3. The video decoding apparatus according to claim 2, wherein the OOB determination unit determines to disable the OOB processing on the reference block in a case that the reference picture resampling processing is applied to the reference picture including the reference block.

4. The video decoding apparatus according to claim 2 wherein the OOB determination unit changes a method of determining whether the OOB processing is targeted to the reference block in a case that the reference picture resampling processing is applied to the reference picture including the reference block.

5. The video decoding apparatus according to claim 4, wherein the OOB determination unit determines whether to be targeted for the OOB processing by using a coordinate value corrected using a same scale value as the reference picture resampling processing in the case that the reference picture resampling processing is applied to the reference picture including the reference block.

6. A video encoding apparatus comprising an OOB determination unit configured to determine whether a reference block is targeted for OOB processing by comparing coordinates of the reference block with coordinates of a picture, and an OOB mask derivation unit configured to derive mask data representing availability of each pixel by comparing coordinates of a pixel included in the reference block with coordinates of the picture plus offset, wherein the OOB determination unit determines whether the reference block is targeted for the OOB processing by using presence or absence of processing to be applied to a reference picture including the reference block.

* * * * *